Figure 2:
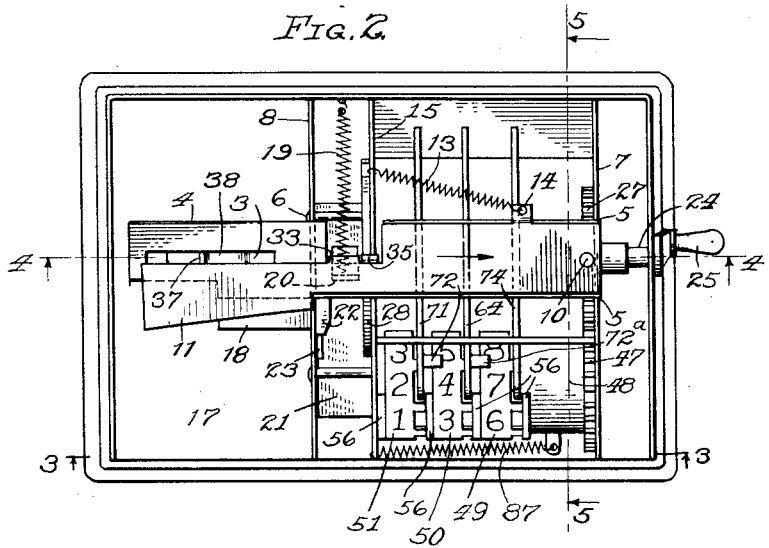

G. B. BEALE.
COIN CONTROLLED MECHANISM.
APPLICATION FILED NOV. 11, 1912.
1,142,745.
Patented June 8, 1915.
4 SHEETS—SHEET 1.
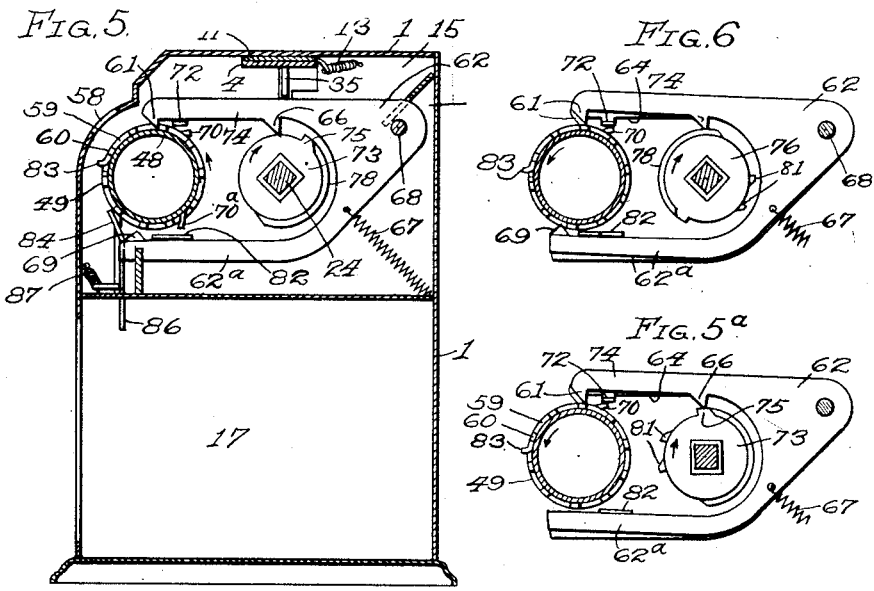
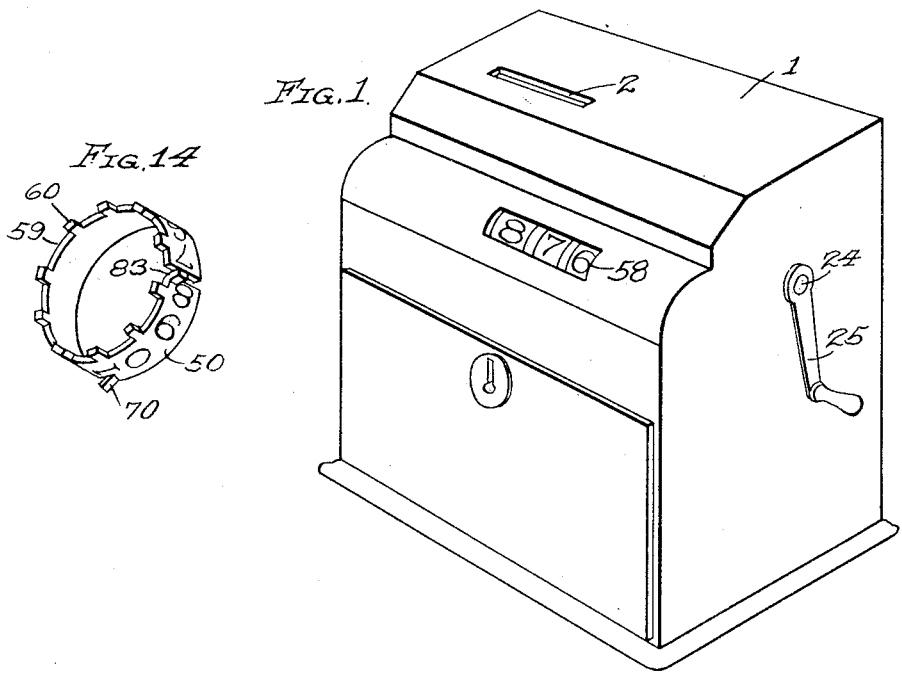
WITNESSES:
L. B. Graham
Milton Lenoir
INVENTOR:
George B. Beale
By
Atty.

G. B. BEALE.
COIN CONTROLLED MECHANISM.
APPLICATION FILED NOV. 11, 1912.

1,142,745.

Patented June 8, 1915.
4 SHEETS—SHEET 2.

WITNESSES:
L. B. Graham
Milton Lenoir

INVENTOR:
George B. Beale
By
Atty

G. B. BEALE.
COIN CONTROLLED MECHANISM.
APPLICATION FILED NOV. 11, 1912.
1,142,745.
Patented June 8, 1915.
4 SHEETS—SHEET 3.
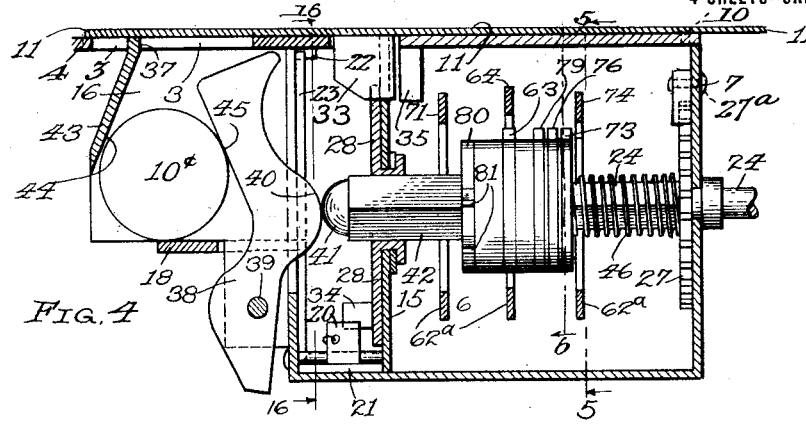
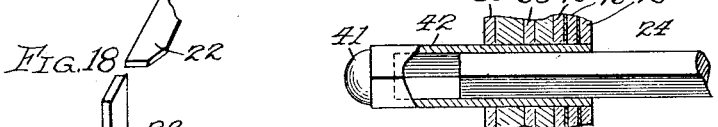
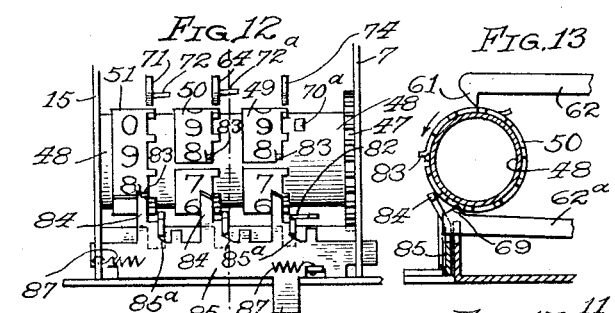
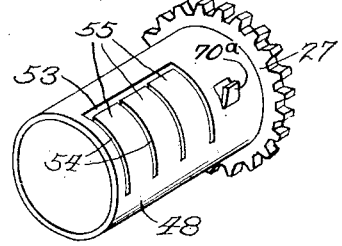
WITNESSES:
L. B. Graham
Milton Lenoir
INVENTOR:
George B. Beale
By
Atty.

G. B. BEALE.
COIN CONTROLLED MECHANISM.
APPLICATION FILED NOV. 11, 1912.
1,142,745.
Patented June 8, 1915.
4 SHEETS—SHEET 4.
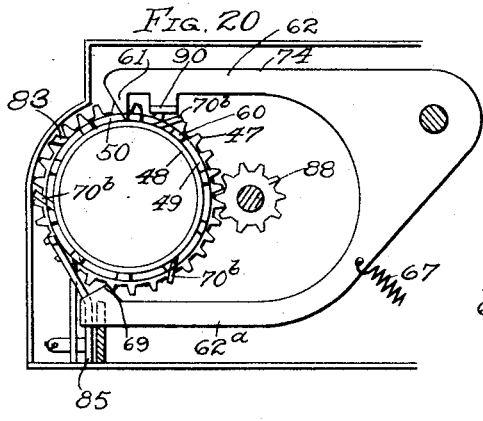
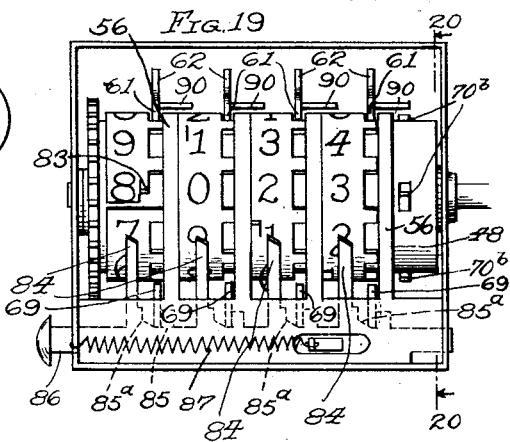
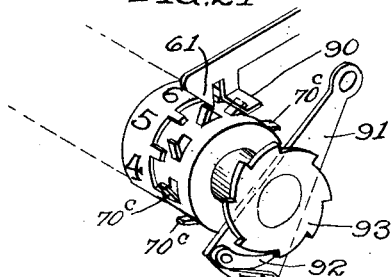
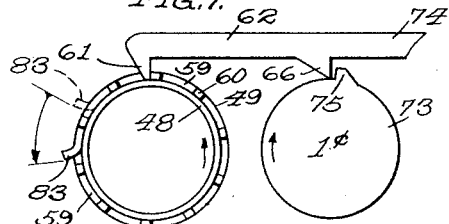
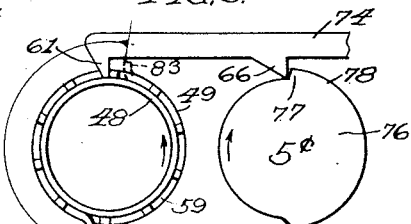
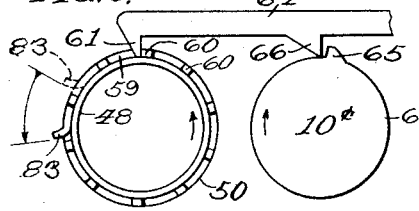
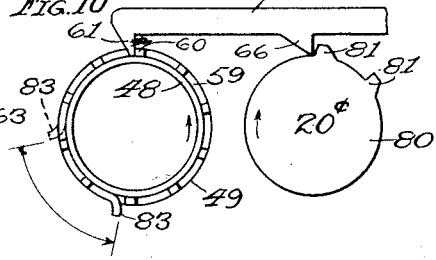
WITNESSES:
L. B. Graham
Milton Lenoir
INVENTOR:
George B. Beale
By
Atty.

UNITED STATES PATENT OFFICE.

GEORGE B. BEALE, OF MAYWOOD, ILLINOIS.

COIN-CONTROLLED MECHANISM.

1,142,745.　　　　Specification of Letters Patent.　　Patented June 8, 1915.

Application filed November 11, 1912. Serial No. 730,794.

*To all whom it may concern:*

Be it known that I, GEORGE B. BEALE, a citizen of the United States, residing at Maywood, in the county of Cook and State of Illinois, have invented certain new and useful Improvements in Coin-Controlled Mechanism, of which the following is a specification.

The present invention relates to a coin-controlled device for registering the number of units represented by the movement of a part (hereinafter called the "primary part") or a number of such parts, all of which units are added together and the total indicated by numerals on the wheels, disks, or equivalent parts of a so-called adding train, so that the sum total of the units so registered—or the "register-total"—may be read off at a glance. Such a device may be used to register and indicate the number of various fact-units or characteristics of, or represented by the movement of, the primary part or parts, such, for example, as the number of complete or partial strokes or movements or revolutions of the primary part or parts, or the equivalent thereof reduced to various denominations, such as units of time, distance, weight, value, money, or the like, depending upon a characteristic or characteristics of the thing which controls or is controlled by the movement of said primary part. All such devices are known as and usually called "registers", with prefixes indicating the particular uses to which they are put.

The various novel features of the invention, so far as the present application is concerned, relate and are also equally applicable to that class of devices that are usually called "recorders", which are, in fact, nothing more nor less than "registers" within the meaning of this term, as just above explained, plus means whereby a permanent record of the results shown by the register is made in some suitable manner, as for example, characters or lines marked upon a disk, a ribbon, tape or the like, which may be kept for future use.

Generally stated, the objects of the present invention are to provide an improved coin-controlled mechanism for operating, or controlling the operation of, registers, recorders, and similar devices of the class above referred to.

More particularly stated the objects of the invention are to provide coin-controlled mechanism the construction of which is improved with respect to its simplicity, resulting in its low initial cost of production, and the lessening of its liability to get out of working order, without in any way sacrificing its accuracy and reliability in giving results, or its strength or durability.

In registers of the class above referred to the results are usually indicated by numerals arranged decimally on the peripheries of a train of wheels, disks, or equivalent parts, the initial movement for actuating all of the disks, etc., of the adding train being applied to the disk of lowest denomination and from it transmitted through means acting positively and permitting of no relative slipping or lost motion, to the disk of next higher denomination, and so on throughout the entire train, the disks being held in normal positions by frictional contact with adjacent parts.

According to the invention of the present application means are provided for directly operating an adding disk or its equivalent of a given denomination—say tens—instead of operating it indirectly by movement derived from the adding disk of the next lower denomination—say units—and this object is accomplished by positively holding or locking each of the adding disks by a detent having a positive locking or holding action which while in engagement with its appropriate disk prevents it from moving and which when out of engagement will permit it to be moved or operated by movement derived through frictional contact with an adjacent revoluble part, thus exactly reversing the positive and frictional control of the adding disks as they were used in heretofore existing registers.

Another specific object of the invention is to provide means for permitting the quick resetting of the register to zero and, preferably, permitting this to be done by less than one complete revolution of each of the several disks.

Other objects of the invention will appear hereinafter.

As heretofore intimated, the adding trains of registers as heretofore constructed have usually been made up of a plurality of circular plates or disks or wheels mounted to turn upon a central shaft, the disks being centrally perforated to receive the shaft. Thus perforated, each is reduced to annular form, or, in other words, to a ring or band the thickness of which is greater considered radially than axially. According to my invention, as shown, described and claimed in an application filed January 19, 1914, Serial No. 813,047, these relative proportions are exactly reversed and instead of annular disks, strictly so-called, and as commonly understood, rings or bands the thickness of which is less considered radially than axially, are used. But whatever may be the relative proportions of these parts, or by whatever name they may be called, they have some functions in common and to this extent the rings or bands shown in the present application are the mechanical equivalents of the disks or wheels, so-called, used in adding trains as heretofore constructed.

The invention consists in the features of novelty which are hereinafter described with reference to the accompanying drawings.

My original aim was to provide a registering toy bank of generally improved construction. But many of the novel features of the invention are equally applicable to registers and similar devices used for a variety of different purposes and I therefore desire to have it understood that I reserve to myself the exclusive right to use any of the several features of the invention for any purposes for which they are adapted. But having regard to my original aim I will describe the invention in its application to a toy registering bank and will then describe somewhat more fully some other uses to which it may be put.

Figure 3:
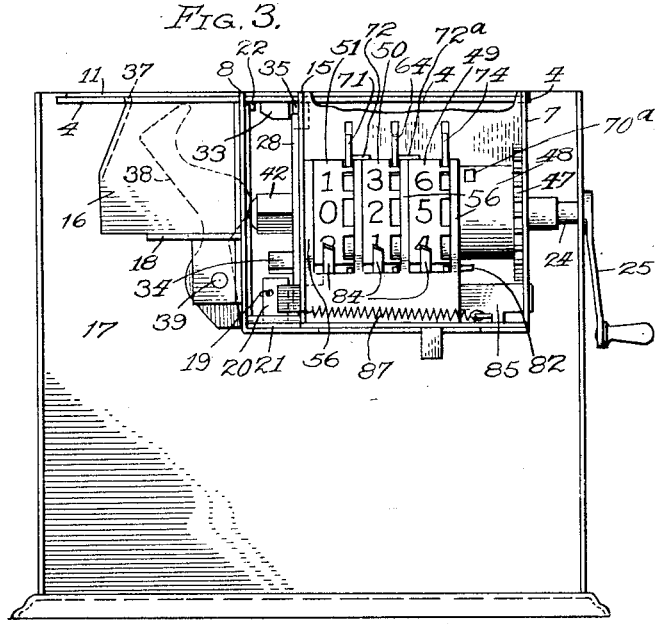

For the purpose of this application the inventions has been shown by the principal figures of the drawings as embodied in a registering toy bank and in said drawings, which are made a part of this specification, Figure 1 is a perspective view of a toy bank embodying the invention. Fig. 2 is a plan view thereof with the top of the casing omitted. Fig. 3 is a front elevation thereof with portions of the casing broken away. Fig. 4 is a vertical longitudinal section thereof on the line 4—4, Fig. 2, looking in the direction of the arrow, i. e., toward the back of the bank. In this figure the parts are shown in the positions which they occupy when a dime is in the coin chute. Fig. 5 is a vertical transverse section thereof on the line 5—5, Fig. 4, looking in the direction of the arrow, and showing the parts in positions which they occupy when the bank is adapted to receive and register coins of any denomination up to quarters. Fig. 5ª is a similar view of some of the parts showing the positions which they occupy at the commencement of the operation of registering a penny. Fig. 6 is a vertical transverse section on the line 6—6, Fig. 4, looking in the direction of the arrow and showing the parts in the positions which they occupy at an intermediate stage in the process of registering a nickel or a quarter. Figs. 7, 8, 9 and 10 are diagrammatic views showing the various cams appropriate to coins of different denominations. The rings of the adding train appropriate to the registering of units of different denominations ("units", "tens" and "hundreds") and the detents for normally holding said rings and preventing their rotation, the parts being shown in their normal positions, i. e., in the positions which they occupy when the chute does not contain a coin but is in readiness to receive one of any denomination provided for. Fig. 11 is an axial section showing details in the construction and arrangement of the cam shaft and cams. Fig. 12 is a front elevation showing the adding train and the resetting mechanism. Fig. 13 is a transverse section thereof on the line 13—13, Fig. 12, looking in the direction of the arrow. Fig. 14 is a perspective view of one of the rings or bands of the adding train. Fig. 15 is a perspective view of the drum or enlarged hollow shaft by which said rings are carried. Fig. 16 is an elevation looking in the direction of the arrow 16, Fig. 4, of the top and bottom shutters of the coin chute and the mechanism for reciprocally withdrawing or opening them in opposition to springs by which they are automatically closed and normally held closed. Fig. 17 is an elevation showing some of the parts of this shutter mechanism on a larger scale. Fig. 18 is a perspective view of the bottom shutter and the slide by which it is carried. Fig. 19 is a plan view of the adding train slightly modified and showing its adaptation to the registering of the number of complete revolutions of a primary part of a shaft. Fig. 20 is an end elevation thereof viewed in the direction of the arrow, 20, Fig. 19. Fig. 21 is a perspective view of a portion of the adding train slightly modified and showing its adaptation to the registering of the number of movements of a reciprocable or oscillatable part.

For the time being, confining the following description to the illustrated embodiment of the invention in a toy registering bank,—the bank has a suitable casing, 1, provided through its top with a slot, 2, for the insertion of coins, one at a time. It will be understood that the casing performs the functions of a supporting frame for such of the parts as require it and hence in the following description its several supporting parts will not be designated by different reference characters excepting where this becomes necessary for the sake of clearness, the presence of necessary supports being left to implication. The slot, 2, for receiving the coins to be registered is constantly in register with a slot, 3, formed through a longitudinally movable slide, 4, consisting of a flat strip of sheet metal which is slidably mounted in notches, 5 and 6, in the upper edges of fixed plates, 7 and 8, respectively, suitably secured within the casing. The notches, 5 and 6, result in shoulders, 9, (Fig. 16) two on each of the plates, 7 and 8, respectively, one at each end of each of the notches between which shoulders the slide, 4, is movable endwise and by which it is guided and confined to a strictly rectilinear movement and steadied and held against lateral movement.

Resting directly upon the top of the slide, 4, and pivoted thereto, as at 10, so as to partake of the longitudinal movement thereof, is a shutter, 11, which is normally held in position to leave the slot, 3, uncovered as shown in Fig. 2, by a light tensile spring, 13, one end of which is connected to the side of the shutter as shown at 14, while its other end is connected to and fixedly anchored to a plate, 15, secured within the casing. The top of the casing, which is flat, rests upon and squarely contacts with the top edges of the plates, 7, 8 and 15, and the depth of the notches is a shade greater than the aggregate thickness of the slide, 4, and shutter, 11, so that the latter is free to move about its pivot while it is at the same time held in place as against accidental displacement.

Located within the casing is a coin chute, 16, the upper end of which is in constant register with the slot 3, (in fact the slots 2 and 3 form continuations of this chute) and the lower end of which, when open, is in communication with a coin receptacle or chamber, 17, into which the coins fall when released by a second shutter, 18, which controls the bottom of the chute. Normally, i. e., when the upper end of the chute is open for the reception of a coin the bottom of the chute is closed by the bottom shutter, 18, which is constantly under the influence of a tensile spring, 19, one end of which is fixedly anchored to the casing while its other end is connected to a lug, 20, which projects upward from a slide, 21, which in turn carries the shutter, 18. But the movement of this slide, 21, and shutter, 18, under the influence of the spring 19 is controlled, or its movement stopped before completion, by stop mechanism which is tripped by the next insertion of a coin and until it is tripped it will also lock the main shaft and prevent it from turning forward, or in the direction in which it turns in operating, the register mechanism. To this end the slide, 4, is provided with a forwardly projecting finger, 22, which lies in the path of the slide, 21, or a projection, 23, carried by it when it is being moved by the spring 19, and until this stop finger is withdrawn from the path of the projection, 23, the spring, 19, cannot complete the movement of the shutter, 18, and the main shaft cannot be turned forward. When a coin is in place in the coin chute, and supported by the bottom shutter, 18, in order to register and release it, one complete revolution of the main shaft, 24, is necessary and to this end the main shaft is provided with an actuating crank-handle, 25, for turning it clock-wise, (forward) its retrograde movement (backward) being prevented by a spring actuated pawl 27$^a$ which engages a gear wheel, 27, which also is carried by the main shaft and has—say twenty-four teeth. Carried by the main shaft is also a cam disk, 28, provided with a peripheral notch, 29, resulting in two oppositely presented shoulders, 30, and 31, and between the ends of this notch the periphery of the disk is concentric with its axis of rotation thereby constituting a "dead cam", 32, or a cam without a lift.

A portion of the metal of the shutter, 11, is bent downward to form a finger, 33, which lies at one side of the plane of the cam disk, 28, and normally opposite the notch, 29, so as to be out of contact with any part of the cam disk. But when the crank-handle is turned clock-wise and the cam disk thereby turned in the direction of the arrow placed upon it in Figs. 16 and 17 the shoulder, 30, moving toward the back of the casing, will engage the finger 33 and move it in the same direction in opposition to the tensile resistance of the spring 13, thereby swinging the top shutter 11 about its pivot and closing the upper end of the coin chute, 16. By reason of the cam shape of the lower edge of the finger, 33, the pressure of the shoulder, 30, against it will lift it out of the notch, 20, the shank portion of the shutter, 11, being made of very thin sheet steel having sufficient elasticity to permit this. When the shoulder, 30, shall have passed out of engagement with the finger 33 the latter will be left in engagement with the dead cam, 32, and by it held in its shifted position with the top shutter 11, closing the top of the coin chute, until the dead cam shall have passed out of engagement with said finger and the latter permitted to drop over the shoulder, 31, and back into the notch, 29, whereupon the spring 13 will swing the shutter 11 about its pivot 10 and open the upper end of the coin chute. But an instant before this takes place a tappet, 34, carried by the cam disk, 28, will have come in contact with the rear side of the lug, 20, projecting upward from the slide, 21, and move it forward and thereby draw the bottom shutter 18 forward in opposition to the resistance of the spring 19 and open the lower end of the coin chute, permitting the coin to fall into the receptacle, 17. It will be seen that acting through the medium of the shutter, 11, and its pivot, 10, the spring, 13, has a constant tendency to move the slide 4 in the direction opposite the arrow appearing in Fig. 2, to its normal position and there hold it with a yielding force.

Projecting downward from the slide 4 and preferably formed by bending downward a portion of the plate of which it is made is a finger, 35, and when the slide is in its normal position, i. e., at the extremity of its permitted movement toward the left, as the parts are shown in the drawings, this finger crosses the plane of the cam disk, 28, and projects into the path of the shoulder, 30, as shown in Fig. 16, so that when in its normal position aforesaid the slide 4 and its finger 35 will constitute a stop for preventing forward turning of the cam disk, 28. In order to afford lateral support to the slide at this point, the finger 35 occupies a notch or saw-cut, 36, in the upper edge of the fixed plate 15.

Assuming the parts to be in the positions in which they are shown in Fig. 4 of the drawings a coin inserted through the slot, 3, will at one point on its periphery engage the side of the coin chute, 16, at a point—say indicated at 37—adjacent to one end of the slot, 3, through the slide 4, and at a point on the periphery at its opposite side the coin will engage the slide 4 at the opposite end of the slot 3. The forcing of the coin down into the chute will exert pressure in one direction against the chute, at 37, and in the opposite direction against the slide 4 at the opposite end of the slot 3, thus causing the slide to move in the direction of the arrow in Fig. 2, in opposition to the resistance of the spring, 13. This will move the stop finger 35 and the lower end of the finger, 33 out of the plane of the cam disk, 28, and out of the path of the shoulder 30 thereon, thus permitting the turning of the main shaft to operate the registering mechanism and at the same time move the finger 33 into the notch 29 and into the path of the shoulder, 30.

Projecting into the coin chute is a lever, 38, fulcrumed at 39 and having a cam surface, 40, which engages the hemispherical end, 41, of a longitudinally movable section, 42, of the main shaft. This lever may be considered as the "primary movable part" herein mentioned. This longitudinally movable section is in the form of a hollow sleeve or tube, the interior of which is of non-circular cross-section and receives within it the crank-handle section, 24, of the main shaft, the external shape of the latter being complementary to the interior shape of the section 42 (hereinafter called the "cam-shaft") so that the cam shaft is capable of sliding endwise upon the crank-handle section, 24, of the main shaft, while they are incapable of any rotary movement relative to each other. When a coin has been inserted and is at rest in the chute it rests upon and is supported by the bottom shutter, 18. It should also be stated that at one side of its center the coin bears against the inclined side, 43, of the chute—say at a certain point, 44, or elsewhere, depending upon the diameter of the coin. At a point on the opposite side of the coin it also bears upon the back of the lever, 38, say at the point 45, also depending upon the diameter of the coin. The diameters of the coins and the relative sizes, shapes, proportions and dispositions of all of these parts are factors which enter into the extent of the longitudinal movement of the cam shaft, 42, and the position in which it is left and held by an inserted coin of a given diameter; and therefore, the diameter and denomination of all coins being relatively fixed factors, the positions in which the coin cams are left will be determined by the denomination of the coin which is for the time being in position to be registered.

It would be next to impossible to accurately describe, in words, the exact size, shape, proportions and relative locations of even the single mechanism shown in the drawings for causing the insertion of a coin of a given denomination to move the camshaft exactly the necessary distance and leave it in the exact position which it must occupy in order to cause the proper operations of the register which are appropriate to coins of different denominations. Suffice it to say, that the coin chute and lever are so constructed and arranged that coins of different denominations condition for proper operation trip mechanism for freeing the registering rings of corresponding denominations and permitting them to turn or advance through the appropriate number of their predetermined units of movement, as hereinafter fully explained.

The cam-shaft and its cams are yieldingly held in normal positions, or the positions in which the several cams are incapable of performing their intended functions, by an expansion spring, 46, which surrounds the part, 24, of the main shaft and exerts its pressure in one direction against said part 24 through the medium of the gear wheel, 27, which is non-rotatively secured to it, and in the other direction against the cam-shaft, either directly, or indirectly through the medium of one of the cams carried by it. The gear wheel, 27, meshes with a corresponding gear wheel, 47, so that they turn in opposite directions at the same ratio. The gear wheel 47 is non-rotatively secured to a part, 48, the generic characteristic of which is that of a shaft mounted to turn in bearings supported by the fixed plates, 7 and 15. In this aspect it is the shaft of the adding train, although for reasons that will appear hereinafter, it is of comparatively greater relative diameter than the shafts of adding trains as heretofore constructed.

According to the present invention the adding train comprises a plurality of registering bands or rings, 49, 50, 51, etc., depending upon the total capacity which it is desired the register shall have, representing, decimally, units, tens, hundreds, etc., and bearing on their peripheries the numerals 0 to 9 arranged equidistantly so as to correspond with their predetermined units of revolution. These adding rings surround the shaft, 48, and fit it with such frictional contact that when not locked or held the rings will partake of the movement of the shaft and be carried with it. On the other hand, the fit is such that when the rings are locked or positively held against turning about their axes the shaft may turn or rotate independently of them, these being the normal relative conditions of these parts. And here I desire to have it understood that in its broadest aspect the invention is not limited to friction devices or means of any particular construction for frictionally transmitting movement from the adding train shaft to the adding rings, or their equivalents, whereby under one set of conditions the adding rings will partake of the movement of the shaft while under another set of conditions the adding rings may be held or locked against turning about their axes while permitting the shaft to turn. This frictional transmission may be accomplished by using contracting elastic rings of spring metal which may be left open or split longitudinally, as shown at 53, or by using both contracting rings and an expanding shaft; it being preferred to use both of these expedients as shown in the drawings. To still further increase the elasticity of the frictional contact the spring-metal tube is slit circumferentially, as shown at 54 in Fig. 15, said circumferential slits extending—say through about 90 degrees—and intersecting the longitudinal slit, 53, thereby resulting in circumferential spring tongues, 55. When these circumferential slits are used the adding rings preferably cover them by overlapping adjacent edges of adjacent tongues, 55, for a reason that will appear hereinafter. The adding rings of different denominations are spaced at the proper distance apart by tongues, 56, formed on a sheet metal plate, 57, which is fixedly secured to some suitable part of the frame or casing, said tongues being curved to conform to the shaft, 48, and being of sufficient length to embrace about one-half of its circumference, whereby the adding rings are guided and steadied in their movement and all tendency to cramp or bind is avoided. These spacing tongues are omitted from Fig. 12 in order to avoid obscuring some of the other parts that are shown in said figure.

Each of the adding rings carries on its periphery the numerals 0 to 9, inclusive, equidistantly spaced apart, and the casing 1 is provided with a window or peephole, 58, through which one of the numerals of each of the rings when properly alined may be seen in the manner common to registers of this character. One end of each of the adding rings (the term "end" being here used with relation to the extended longitudinal axis of the ring) is provided with ten equidistant notches, 59, resulting in an equal number of intervening projections, 60, the forward sides of which afford shoulders that are adapted to be engaged by the toes, 61, of detents, the principal elements of which are lever arms, 62, of which there are as many as there are registering or adding rings, one detent lever being appropriate to the adding ring of each denomination. It will be seen that so long as the toe of any particular detent lever remains in engagement with a shoulder or projection, 60, of its appropriate adding ring that ring will be prevented from turning with the shaft, 48, whereas immediately upon the lifting of the detent lever arm and the consequent disengagement of its toe from the shoulder, 60, the adding ring will partake of the movement of the shaft, 48, and continue to move with it until the toe, 61, again enters one of the notches, 59, and comes to such a position that it will engage the next succeeding shoulder, 60, whereupon the adding ring will be stopped and again prevented from moving with the shaft, 48. The disengaging of the detent levers from the adding rings and the permitting of them to again engage is accomplished by a plurality of cams which are secured to and carried by the cam-shaft, 42, the number, character and locations of said cams being determined by, or with relation to, the denominations of the various coins which the bank is adapted to receive and register.

The peculiarities of the mechanism just briefly described can probably be best understood from a succinct description of the operations which take place in receiving, registering, and depositing coins of the several denominations to which the bank shown in the drawings is appropriate.

Starting with the parts in the positions in which they are shown by Fig. 4, with a dime in place in the coin chute, 16, a cam, 63, carried by the cam-shaft, 42, (and which may appropriately be called the "dime-cam"), is in the vertical plane of the detent lever, 64, which may appropriately be called the "tens detent" since its toe, 61, is adapted to be moved into or out of engagement with the shoulders, 60, of the "tens" adding ring, 50. (See Fig. 9.) This cam, 63, called the dime cam, has a single short lift, 65, on its periphery and located in the path of this lift is a cam tooth, 66, projecting downward from the tens detent lever, 64, so that as the cam rotates its lift 65 will engage the cam tooth 66 and lift the lever 64 far enough to lift its toe 61 out of the notch 59 of the adding ring 50 and out of the path of the shoulder 60, thus freeing or unlocking the adding ring 50 and permitting it to partake of the movement of the shaft 48. The lift, 65, is sufficiently high to insure the clearance of the toe, 61, by the shoulder, 60, and is of only sufficient length circumferentially to hold the toe up long enough to make it sure that when it falls it will not enter the same notch, 59, out of which it was lifted, but will fall either on top of the shoulder 60 or into the next succeeding notch 59 of the ring, 50. This will permit the ring 50 to turn with the shaft 48, through not to exceed one predetermined unit of its revolution, or, as shown in the drawings, one-tenth of a revolution, whereupon the toe will engage the next succeeding shoulder, 60, and the adding ring again stopped. More or less lost motion may be permitted between the adding ring, 50, and its shaft, the essential requirement being that the engaging surfaces of the toe of the detent lever and the shoulder 60 shall be accurate, to the end that the adding ring will stop with its peripheral numeral at the proper predetermined point, $i. e.$, or reading line centrally with relation to the window or peephole, 58, as shown on Fig. 1.

Disregarding friction, gravity will cause the detent lever to fall into proper position to engage the shoulder 60 of the adding ring, but in order to make the engagement more certain, especially when the movement is rapid, a spring, 67, has one of its ends connected to the detent lever and its other end fixedly anchored, as shown more clearly in Fig. 5. The general outline of all of the detent levers is substantially the same as is shown in several figures of the drawings, and all of the levers are fulcrumed upon a suitably supported pin, 68. It is found in practice, however, that even when aided by this spring the engaging operation of the detent sometimes fails—especially when the movement is rapid—and in order to guard against this and make the engagement certain and absolutely positive, each of the levers excepting the units or one-cent lever is provided with a second arm, $62^a$, which is approximately parallel with the arm 62 and carries a cam-shaped toe, 69, which is adapted to be engaged by the shoulders or projections, 60, of the adding rings at a point approximately diametrically opposite the notches 59 when at the point at which the toe 61 enters them. In other words, each of the detent levers, considered in its entirety, is constructed and operates substantially in the same manner in connection with its appropriate adding ring as the pallet of a watch operates in connection with the escapement wheel. For example, as shown in Figs. $5^a$ and 6, the toe, 61, of the detent lever is resting upon the top of one of the shoulders or projections, 60, and about ready to drop off and into the next notch, 59. Assuming that the adding ring and its shaft are turning in the direction indicated by the arrow, if for any reason the spring 67 should fail to draw the toe 61 down into the next succeeding notch, this will be done positively by the coming of one of the shoulders or projections, 60, into contact with the cam surface of the toe 69, which causes the arm $62^a$ to be forced downward, moving the detent lever about its fulcrum, 68, and forcing the arm 62 downward. These operations will be repeated each time a dime is inserted in the coin chute and the crank-shaft given one complete revolution, and the only result will be the advancing of the tens adding ring, 50, through one predetermined unit or interval of its revolution until it makes one complete revolution and its peripheral numeral 9 is brought to the sight or reading line, whereupon a tappet, 70, carried by the tens ring and located in the plane of the hundreds detent lever, 71, will engage the said detent lever or a part, 72, carried by it and lying in the path of the tappet 70. As the tens ring then continues to move with its shaft, 48, the tappet 70 will lift the lever, 71, upward and move its toe, 61, out of engagement with the shoulder, 60, of the hundreds ring 51. The hundreds ring will then partake of the movement of the shaft, 48, and continue to move therewith until the toe, 61, of the lever 71, falls into the next succeeding notch, 59, on the hundreds ring and engages its resulting shoulder 60, whereupon the hundreds ring will be instantly stopped and held against further rotating with its shaft, its movement having extended just far enough to advance it one interval or predetermined unit of its revolution and bring the next higher numeral on its periphery to the sight line. This means for moving one adding ring through one of its predetermined units or intervals of revolution when the adding ring of the next lower denomination completes each of its revolutions is common to all of the adding rings, and the parts are correspondingly numbered.

If, now, a penny be introduced into the coin chute the penny cam, 73, will be moved into the plane of the units detent lever, 74. (See Fig. 7). The penny or one-cent cam, 73, is precisely like the dime cam, 63, in that it has a single lift, 75, constructed, arranged and operating like the lift 65 of the dime cam 63. Furthermore, the units detent lever 74 is constructed and operates precisely like the tens detent lever 64, excepting that it does not have a projection similar to the projection 72, because there is no adding ring of lower denomination than the units ring, whose sum is to be added to the adding ring of the next higher denomination. Nor does the units lever have a cam toe similar to 69 which latter positively draws the toe 61 of the toe on the same lever with it down into each and every notch, 59, the path of which it occupies, whereas, as now to be described, the units lever is used for adding five cents or a nickel at a time, and when this is being done the toe 61 must be held out of five successive notches until it is again allowed to engage a shoulder 60 and stop the adding ring. If, now, a nickel be inserted in the coin chute the nickel cam, 76 (in Fig. 8) will be brought into the plane of the units detent lever, 74. This cam, 76, is like those already described in that it has only a single lift, 77, by which the units lever 74 is lifted, but it is unlike them in that this lift terminates in a dead surface, 78, which is concentric with the axis of the cam so that it will hold the units detent lever in elevated position with its toe 61 out of engagement with the units adding ring 49 through a circumferential distance equal to five of the intervals or units of revolution of the units adding ring 49. It will be apparent that the result of this will be to allow the units adding ring to move through five of its intervals or units of revolution before the tooth 66 escapes from the dead surface 78 and permits the detent lever 74 to move or be moved downward and again arrest the movement of the units ring 49 and prevent it from partaking of the movement of its shaft 48. Upon the deposit of another nickel the same operations will take place and complete the revolution of the units adding ring 49, lift the toe 61 of the tens lever 64 out of engagement with the tens adding ring 50, and allow the latter to advance one interval. The units lever 74, being without a cam toe 69, in order to positively move it and force its toe 61 into engagement its arm 62ª, is provided with a tongue or plate 82 which is engaged by a tappet 70ª on the shaft 48 so located that when the toe 66 is about to drop off of the dead surface 78 of the lift 77, the tappet 70ª will be about ready to engage the tongue or bearing plate 82 on the units lever and this tappet 70ª will force the lever arms downward and the toe 61 into engagement. As before described, when the units adding ring is about to complete its revolution and bring the 0 to the sight line the tappet 70, carried by the ring 49 will trip the tens detent lever 64 and permit the tens adding ring 50 to move through one interval or unit of its revolution. If, now, a quarter be inserted in the coin chute the twenty-cent cam, 80, will be moved into the plane of the tens detent lever 64 and the five-cent cam 79 will be moved into the plane of the units detent lever 74, the construction and operation of this five-cent cam and its accessories are precisely like the nickel cam 76 which has already been described. After the interval that it is turning with the tooth 66, resting upon the dead surface 78, and before the revolution of the cam shaft is completed, two lifts, 81, and the 20-cent cam, 80, will successively lift the tens detent lever 64 and free the tens adding ring 50 so that until the toe of said detent lever 64 again engages one of the shoulders, 60, on the tens adding ring 50 the said adding ring will move with its shaft 48 and this movement will continue through two of its predetermined intervals or units of revolution, thus advancing two of its peripheral numerals to the reading line.

From the foregoing description the operation of the improved register will be fully understood by those familiar with the operation of registers of this same general character.

The improved register has the advantages over those heretofore existing in that it is rapid, positive and certain in all of its operations; it is simple in its construction and may therefore be produced at a comparatively low cost; while its operations are delicate, its parts are such that they are not liable to get out of working order; its registering or adding rings of high denomination may be operated directly instead of through the medium of the adding rings of lower denomination, and it may be quickly reset at 0 by not to exceed a complete revolution of the main shaft. This latter is accomplished by providing each of the register rings with a stop lug, 83, and providing also a series of stops, 84, which are adapted to be brought into the paths of the stop lugs 83, respectively, whereby when the numerals 0 on the peripheries of the rings arrive at the reading line all of the adding rings are stopped. Preferably these stops, 84, are in the form of teeth projecting from the edge of the plate, 85, supported in suitable bearings so that they are capable of being moved endwise by a finger-piece, 86, which is accessible from the outside of the casing. Thus all of the stops 84 may be simultaneously moved into the path of the stop lugs, 83, of the respective adding rings so that when stop lugs engage said stops all of the naughts will be in alinement at the reading line, and the movement of the plate 85 which thus simultaneously moves all of the stops into operative positions also simultaneously trips the detents of all of the adding rings. To this end the plate 85 is provided beneath each of the arms 62ª of each of the detent levers with a cam 85ª so that when the plate 85 is moved endwise the cam will engage and lift the detent levers with the result described. A delicate coiled spring, 87, is anchored at one end and has its other end connected to the slide, 85, for holding the stops 84 in normal positions, i. e., out of the paths of the stop lugs 83. Preferably the ends or bearing surfaces of the stops 84 are inclined in order to avoid that nicety of construction which would otherwise be necessary in order to accurately stop the adding rings.

As before stated, the invention is applicable to registers or other devices using such mechanism generally, for various purposes, and to this end the adaptation of the invention to a register for registering—say the complete revolutions of a shaft—is shown in Figs. 19 and 20. Here, instead of the main shaft, 24, and the cam-shaft, 42, of the registering toy bank above described, a simple gear wheel, 88, is arranged to mesh with the gear wheel 47 already described, the ratios of the wheels, 47 and 88, being 3 to 1, as shown, but this is optional. In this arrangement the wheel 88 may be considered as the last of a train of gear wheels by which the rotation of the shaft, whose number of rotations is to be registered, or it may be considered as mounted directly on such shaft. In either event each complete revolution of the wheel 88 will cause one-third of a revolution of the wheel 47, and the shaft, 48, of this wheel, which may be considered as the shaft 48 already described, carries three equidistant tappets, 70$^b$, in the rotating plane of which is located a projection, 90, carried by the units detent lever, 74, so that as the shaft 48 rotates it will successively raise the detent lever 74 so as to move its tooth 61 out of engagement with one of the shoulders, 60, of the units adding ring 49 and permit it to again drop back into the succeeding notch 59 in position to engage the next succeeding shoulder, 60, when it reaches the toe, 61, and thus again stop the adding ring and prevent it from further partaking of the movement of the shaft 48. It will thus be seen that each complete revolution of the wheel 99 will cause the units adding ring to advance through one of its predetermined intervals or units of revolution and advance next higher the numeral on its periphery to the reading line so that the units ring registers the number of complete revolutions of the wheel 88, or other part, depending upon the character of the reducing gear.

Fig. 21 shows the adaptation of the invention to the registering of reciprocating movements, and to this end a lever, 91, is fulcrumed upon the shaft, 48, so as to be capable of oscillating thereon, and this lever carries a spring-pressed pawl, 92, which engages a ratchet wheel, 93, non-rotatively carried by the shaft 48, so that at each complete to and fro oscillation of the lever 91 a tappet 70$^c$, of which there may be any predetermined number (ten being shown) on the shaft 48, is advanced through one of the predetermined intervals or units of revolution of the shaft 48 and indicates the number of strokes imparted to the lever 91.

It will be understood that the term "coins" as used in the foregoing specification is simply indicative or suggestive of a thing that will accomplish the results which are accomplished by the use of coins, strictly so-called, in connection with the register. Hence the "slugs" or tokens sometimes used in coin controlled apparatus are the mechanical equivalents of coins, strictly so-called, when so used that they will cause the register to operate in the manner described.

I do not herein claim those features that relate to the coin controlled mechanism. They are made the subject of a separate application filed Jan. 19, 1914, Serial No. 813,047.

What I claim as new and desire to secure by Letters Patent is:

1. In a register, the combination of a revoluble part having a power transmitting friction surface, a registering ring revoluble independently of said part, having a friction surface engaging the friction surface aforesaid whereby movement is transmitted from the former to the latter, a detent for normally engaging the registering ring and preventing it from revolving while permitting said revoluble part to revolve relatively to said ring and means for tripping said detent, thereby freeing the registering ring and permitting it to be revolved by movement derived from said revoluble part, said tripping means having means whereby it is controlled by coins of different denominations.

2. In a register, the combination of a revoluble part having a power transmitting friction surface, a registering ring revoluble independently of said part, having a friction surface engaging the friction surface aforesaid whereby movement is transmitted from the former to the latter, a detent for normally engaging the registering ring and preventing it from revolving while permitting said revoluble part to revolve relatively to said ring, and means for tripping said detent, thereby freeing the registering ring and permitting it to be revolved by movement derived from said revoluble part, said tripping means having means whereby its operation is controlled by and made dependent upon the different characteristics of different coins.

3. In a register, the combination of a revoluble part having a power transmitting friction surface, a registering ring surrounding said part and revoluble independently thereof, having a friction surface engaging the friction surface aforesaid whereby movement is transmitted from the former to the latter, a detent normally engaging said registering ring and preventing it from revolving while permitting said part to revolve relatively to the ring, and means for tripping said detent, thereby freeing the registering ring and permitting it to be revolved by the movement derived from said revoluble part.

4. In a register, the combination of a revoluble shaft having a power transmitting friction surface, a registering ring surrounding said shaft and revoluble independently thereof, having a friction surface engaging the friction surface aforesaid whereby movement is transmitted from the shaft to the ring, a detent for normally engaging the registering ring and preventing it from revolving while permitting said shaft to revolve relatively to said ring, and coin controlled means for tripping said detent, thereby freeing the registering ring and permitting it to be revolved by movement derived from said shaft.

5. In a register, the combination of a revoluble shaft, a registering ring surrounding said shaft and having such frictional contact with the peripheral surface thereof that it may partake of the movement of said shaft or be held against movement with said shaft, a detent for normally engaging the ring and preventing it from partaking of the movement of the shaft, means for tripping said detent, thereby freeing the registering ring and permitting it to partake of the movement of the shaft, and means for causing the detent to again engage the registering ring and hold it against movement with the shaft, after the registering ring has advanced through a predetermined interval of its revolution.

6. In a register, the combination of a revoluble shaft, an elastic contracting registering ring surrounding the shaft and having frictional engagement with the peripheral surface thereof whereby it may or may not be permitted to partake of the revolution of the shaft, a detent for normally engaging said registering ring and preventing it from partaking of the movement of the shaft, coin controlled means for tripping said detent, thereby freeing the registering ring, said tripping means having means for holding the detent out of engagement and permitting it to partake of the movement of the shaft through a predetermined number of its units of revolution, and means for again moving the detent into engagement with the registering ring so as to stop it and prevent its further movement after it has been turned through the aforesaid number of its units of revolution.

7. In a register, the combination of an elastic expanding revoluble shaft, a registering ring surrounding said expanding shaft and having frictional contact therewith whereby it may or may not partake of the movement of said shaft, a detent for normally engaging said registering ring and preventing it from revolving with the shaft, means for tripping said detent, thereby freeing the registering ring and permitting it to partake of the movement of the shaft, and means for moving said detent into engagement with the registering ring and thereby stopping it and preventing its further revolution with the shaft.

8. In a register, the combination of an elastic expanding revoluble shaft, an elastic contracting registering ring surrounding said shaft and having frictional contact therewith, a detent for normally engaging said registering ring and preventing it from revolving while permitting the shaft to revolve relatively thereto, means for tripping said detent, thereby freeing the registering ring and permitting it to be revolved by frictional contact with the shaft, and means for moving the detent into engagement with the registering ring and stopping it and preventing it from further revolving with the shaft.

9. In a register, the combination of a revoluble shaft made of a tube of elastic metal slit longitudinally, a registering ring surrounding said shaft and having frictional contact therewith, a detent normally engaging the registering ring and preventing it from partaking of the movement of the shaft, mechanism for tripping said detent, thereby freeing the registering ring and permitting it to partake of the revolution of the shaft, and means for moving the detent into engagement with the registering ring for stopping it and preventing it from partaking of the further movement of the shaft.

10. In a register, the combination of a revoluble shaft, a registering ring surrounding it, said ring being open or slit longitudinally and being made of elastic metal so that it has a normal tendency to contract into frictional contact with the shaft, a detent normally engaging said registering ring for preventing it from partaking of the movement of the shaft, means for tripping said detent, thereby freeing the registering ring and permitting it to partake of the movement of the shaft and means for moving said detent into engagement with the registering ring and stopping it and preventing its further movement with the shaft.

11. In a register, the combination of a revoluble part having a power transmitting friction surface, a plurality of registering rings revoluble independently of said part, and having friction surfaces engaging the friction surfaces aforesaid for transmitting motion from one to the other, a plurality of detents for normally engaging said registering rings, respectively, and preventing them from revolving while permitting said part to revolve relatively to them, a plurality of devices for tripping said detents, respectively, and moving and holding them out of engagement with their respective registering rings, thereby freeing the latter and permitting them to be revolved by movement derived from said revoluble part, said tripping devices having different characteristics for determining the number of intervals of revolution of said registering rings, respectively, during which the respective detents are held out of engagement with their respective rings.

12. In a register, the combination of a revoluble shaft having a power transmitting friction surface, a registering ring surrounding the shaft, and having a friction surface engaging the friction surface aforesaid for transmitting movement from the former to the latter, a detent normally engaging said ring for preventing it from revolving with the shaft, means for tripping said detent and moving it out of engagement with the registering ring, thereby freeing it and permitting it to revolve with the shaft, said tripping means having a plurality of shiftable cams having surfaces of appropriate height for moving the detent out of engagement with the registering ring and also surfaces of appropriate height for holding it out of engagement during a predetermined interval corresponding with coins of different denominations, and means for shifting said cams into different operative positions, depending upon the denomination of the coin.

13. In a register, the combination of a revoluble part, a plurality of registering rings revoluble independently of said part and arranged in proximity to each other, concentrically with a common axis, forming an adding train, said rings having friction surfaces engaging the friction surfaces aforesaid for transmitting movement from said revoluble part to said registering rings, a plurality of detents normally engaging said rings respectively for preventing them from revolving while permitting said part to revolve relatively to them, means for tripping said detents and thereby freeing the registering rings and permitting them to be revolved by movement derived from said revoluble part, said tripping means having a plurality of differing devices, any desired one of which may be moved into operative relation to one and the same detent, and means for again moving said detents into engagement with said registering rings after the latter have been turned through a predetermined number of intervals or units of their revolution.

14. In a register, the combination of a revoluble shaft having a power transmitting friction surface, a plurality of registering rings mounted upon said shaft and forming an adding train, said rings having friction surfaces engaging the friction surfaces aforesaid for transmitting movement from said shaft to said registering rings for causing them to revolve with the shaft, a plurality of detents normally engaging said registering rings respectively for preventing them from revolving with the shaft, and means for tripping said detents, thereby freeing the registering rings and permitting them to revolve with the shaft, said tripping means having a plurality of cam disks having working surfaces of different lengths, any one of which cam disks may be moved into operative relation to one and the same detent, thereby permitting the said registering rings to be revolved through a predetermined number of intervals or units of its revolution.

15. In a register, the combination of a plurality of registering rings arranged to form an adding train, a plurality of detents normally engaging said rings, respectively, for preventing them from revolving, means carried by each registering ring of lower denomination for freeing the detent of the registering ring of the next higher denomination, and means for tripping said detents and thereby freeing their respective registering rings, said coin-controlled tripping means having a plurality of cam disks having working surfaces of different lengths, said cam disks being movable, so that any one of them may be brought into operative relation to one and the same detent.

16. In a register, the combination of a revoluble part having friction surfaces, a plurality of registering rings mounted on said revoluble part and having friction surfaces engaging the friction surfaces aforesaid, said rings being arranged to form an adding train, a plurality of detents normally engaging said rings, respectively, for preventing them from revolving, means carried by each ring of lower denomination for tripping the detent of the ring of the next higher denomination and permitting the latter to revolve, additional means for tripping the detents independently of the tripping means first aforesaid, the tripping means last aforesaid having cam disks, an endwise movable shaft on which said cam disks are non-rotatively mounted, means for moving said shaft endwise to bring any one or more of said cam disks into operative relation to one or more of said detents, and means for revolving said shaft.

17. In a register, the combination of a revoluble shaft, a plurality of registering rings surrounding the shaft and having frictional contact therewith, detents having levers provided with toes for engaging the registering rings and preventing them from revolving with the shaft, means for tripping said detents and moving their toes out of engagement with the registering rings, thereby freeing the latter and permitting them to revolve with the shaft and positive-acting means actuated by one of the moving parts for moving the toes of the detents into engaging positions at the appropriate times.

18. A register having, in combination, a plurality of registering members having friction surfaces, means having friction surfaces engaging the friction surfaces aforesaid for revolving the registering members, and means for quickly re-setting the registering members, at zero, said re-setting means having means for simultaneously tripping all of said coin controlled detents and permitting all of the registering members to be revolved by the friction means aforesaid, and stops for arresting the movement of the registering members when their numerals, 0, are in line with each other.

19. In a coin controlled mechanism the combination of a revoluble shaft, a plurality of registering rings surrounding the shaft and having frictional engagement therewith whereby the rings when free are permitted to revolve with the shaft, a plurality of detents engaging the registering rings and preventing them from revolving, a plurality of detent cams having means for tripping the respective detents and permitting the registering rings to revolve and means controlled by coins of different denominations for moving the appropriate detent cams into operative position.

20. Coin controlled mechanism having, in combination, a plurality of revoluble registering rings, friction means for revolving said rings, respectively, when free, each of said rings having a plurality of shoulders, a plurality of detents having levers provided with toes to be moved into or out of engagement with said shoulders, a plurality of cams having means for lifting said detent levers and moving said toes out of engagement with said shoulders, and also determining the number of intervals or units of revolution during which said toes are held out of engagement with said shoulders, and coin controlled mechanism for moving the appropriate cams into operative positions.

21. Coin controlled mechanism having a coin chute and a lever extending thereinto, in combination with a plurality of rings arranged to form an adding train, a plurality of shiftable cams, a shaft carrying said cams, means for transmitting movement from said shaft to the rings when the latter are released, and means actuated by said cams for locking and releasing the rings of the adding train, the coin chute, the lever and the coöperating parts being so constructed and arranged that the cam or cams appropriate to a coin of given denomination in the chute and engaging the lever will be shifted into proper position for engaging and releasing the locking means of the ring of corresponding denomination.

GEORGE B. BEALE.

Witnesses:
L. M. HOPKINS,
JOSEPHINE HOLQUIST.

Copies of this patent may be obtained for five cents each, by addressing the "Commissioner of Patents, Washington, D. C."